(12) United States Patent
Wiejack-Symann

(10) Patent No.: US 7,150,351 B2
(45) Date of Patent: Dec. 19, 2006

(54) SCRAPER CHAIN CONVEYOR COMPRISING PLASTIC PUSHERS

(75) Inventor: Elmar Wiejack-Symann, Krefeld (DE)

(73) Assignee: RAG Aktiengesellschaft (DE)

( * ) Notice: Subject to any disclaimer, the term of this patent is extended or adjusted under 35 U.S.C. 154(b) by 0 days.

(21) Appl. No.: 10/536,793

(22) PCT Filed: Nov. 20, 2003

(86) PCT No.: PCT/EP03/12993

§ 371 (c)(1), (2), (4) Date: May 26, 2005

(87) PCT Pub. No.: WO2004/048234

PCT Pub. Date: Jun. 10, 2004

(65) Prior Publication Data

US 2006/0027442 A1  Feb. 9, 2006

(30) Foreign Application Priority Data

Nov. 26, 2002 (DE) ................. 102 54 970

(51) Int. Cl.
*B65G 19/24* (2006.01)
(52) U.S. Cl. .............. 198/730; 198/728; 198/729; 198/749
(58) Field of Classification Search ............ 198/728, 198/729, 730, 749, 717
See application file for complete search history.

(56) References Cited

U.S. PATENT DOCUMENTS

| | | | | |
|---|---|---|---|---|
| 2,680,511 A | * | 6/1954 | Hapman ............... | 198/733 |
| 4,213,527 A | * | 7/1980 | Lapeyre et al. ........ | 198/853 |
| 4,316,537 A | * | 2/1982 | Rieger et al. .......... | 198/731 |
| 4,325,479 A | * | 4/1982 | Pirovano et al. ....... | 198/733 |
| 4,573,568 A | * | 3/1986 | Maag et al. ........... | 198/731 |
| 4,645,598 A | * | 2/1987 | Hannum ............... | 210/232 |
| 5,046,601 A | * | 9/1991 | Burdon et al. ......... | 198/731 |
| 5,806,658 A | * | 9/1998 | Hannum ............... | 198/731 |
| 5,947,261 A | * | 9/1999 | Baker ................... | 198/727 |
| 5,992,644 A | * | 11/1999 | Hannum ............... | 210/525 |
| 6,073,752 A | | 6/2000 | Meya | |
| 6,595,351 B1 | * | 7/2003 | Malitzki ............... | 198/731 |
| 6,695,135 B1 | * | 2/2004 | Lapeyre ................ | 198/853 |

FOREIGN PATENT DOCUMENTS

| | | |
|---|---|---|
| DE | 38 01 618 | 7/1989 |
| DE | 196 33 298 | 2/1998 |
| DE | 196 37 624 | 3/1998 |
| DE | 198 57 399 | 7/1999 |
| DE | 101 12 597 | 10/2002 |
| GB | 1 570 149 | 6/1980 |
| WO | WO 01/81211 | 11/2001 |

* cited by examiner

*Primary Examiner*—Douglas Hess
(74) *Attorney, Agent, or Firm*—Robert W Becker & Associates; Robert W Becker

(57) ABSTRACT

A drag chain conveyor for use in underground mining, including interconnected, profiled conveyor chutes in which are guided conveyor chains of metallic material. Plastic carriers are attached to the conveyor chains, with attachment being effected via a molding around of annular chain links of the conveyor chains with plastic, wherein the plastic, which is molded for a simultaneous production of the plastic carriers monolithically with connecting regions that hold the chain links, penetrates and surrounds the chain links. At least one drive is provided for the conveyor chains.

16 Claims, 2 Drawing Sheets

SCRAPER CHAIN CONVEYOR COMPRISING PLASTIC PUSHERS

This specification for the instant application should be granted the priority date of Nov. 26, 2002, the filing date of the corresponding German patent application 102 54 970.2 as well as the priority date of Nov. 20, 2003, the filing date of the corresponding International application PCT/EP2003/012993.

BACKGROUND OF THE INVENTION

A drag chain conveyor having the aforementioned features is described in US 2004/0140178. Pursuant to one embodiment thereof, at least the carriers are comprised at least partially of a self-distinguishing, difficult to ignite plastic having a high mechanical strength, without any details being provided as to how the conveyor chains, with the carriers connected thereto, should be embodied. It is therefore an object of the present invention to provide, for a drag chain conveyor having the aforementioned general features, a suitable connection of the plastic carriers with the metallic conveyor chains.

SUMMARY OF THE INVENTION

The basic concept of the invention is that the connection of the plastic carriers with the conveyor chain is effected via a molding around of corresponding, annular chain links of the conveyor chain, whereby the plastic, which is molded for the simultaneous production of the plastic carriers monolithically with the connecting regions that hold the chain links, penetrates and surrounds the chain links of the conveyor chain. This has the advantage that the plastic carriers and their connection with the chain links is produced in a single operation. The molding around of the chain links has the advantage that in the critical cross-sectional region, namely at the connection location between chain link and carrier, a massive increase of the cross-sectional region occurs, whereby the carrier geometry, in individual cases, is to be designed such that the critical weak point areas receive a maximum cross-sectional area.

Pursuant to one embodiment of the invention, the conveyor chain can be composed of individual, interconnected chain strands having plastic carriers molded thereon. Since the connection between the plastic carriers and the individual chain links is to occur by molding of a plastic matrix, in particular not underground on location, care is taken that chain strands, with plastic carriers molded thereon, are designed in optimum lengths. The length depends, in individual cases, upon the application and also upon the transport possibilities. For example, chain strands of varying length are provided as standard strands, adapter strands, repair strands, etc.

The design of the plastic carriers and their connection is a function, in individual cases, of the design of the conveyor chains having carriers as a chain unit; for example, it can be provided pursuant to specific embodiments of the invention that the carriers be disposed between two outwardly disposed individual chains, alternatively on a centrally extending chain, or in a further alternative on two spaced apart, centrally extending chains, whereby in the last case a so-called double central chain is formed.

Pursuant to one embodiment of the invention, for the manufacture of the plastic carriers, including their connection regions with the chain links, a plastic material that is able to flow, and that has self-extinguishing, difficult to ignite, and anti-static material properties, is used. For example, a polyamide casting plastic can be used for producing the plastic carriers. Furthermore, from thermoplastics, a polyamide PEI/PAI or a polyether ketone PEEK can be used. A conceivable matrix from duroplastics can be an epoxy matrix, a polyester matrix, or a phenol matrix.

Pursuant to an embodiment of the invention, metallic reinforcing particles are cast into the plastic carriers.

However, in particular it can be provided that for reinforcement of the plastic carriers, reinforcing fibers are introduced into the plastic material.

In this connection, pursuant to a first alternative, short reinforcing fibers having a random distribution are embedded into the plastic matrix. Alternatively, reinforcing fibers that extend over the length of the plastic carriers can be introduced into the plastic matrix, whereby the reinforcing fibers can alternatively be disposed so as to extend about the chain links, or so as to be passed through the chain links.

For the reinforcement of the plastic matrix, mesh, fabric, braiding or knitting of reinforcing fibers can be introduced. Carbon fibers, aramid fibers, or even glass fibers can, for example, be used.

BRIEF DESCRIPTION OF THE DRAWINGS

Embodiments of the invention are shown in the drawing, whereby the illustrations are respectively limited to the showing of an individual plastic carrier with its connection to the chain links of a so-called double central chain having two parallel and spaced-apart central chains. The drawing shows.

Figure 1:
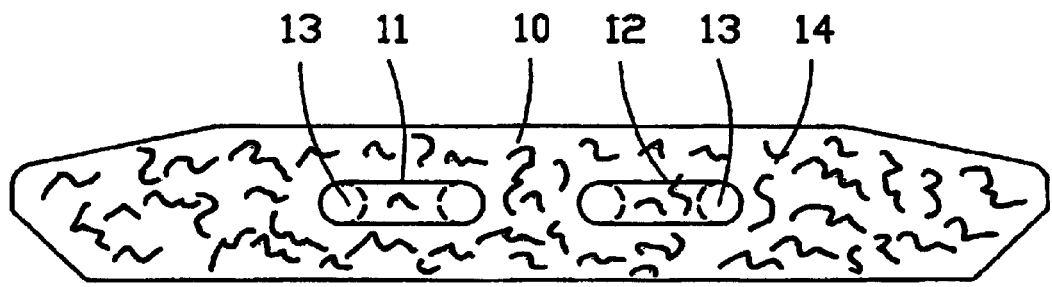
FIG. 1 a carrier with chain connection and short reinforcing fibers introduced in a random distribution, FIG. 2 a plastic carrier pursuant to FIG. 1 having reinforcing fibers extending over the length of the plastic carrier, FIG. 3 another embodiment of the plastic carrier pursuant to FIG. 2, FIG. 4 a further embodiment of the plastic carrier of FIG. 2, FIGS. 5*a* and 5*b* the plastic carrier having a mesh of reinforcing fibers introduced.

The construction of a drag chain conveyor having the aforementioned features can be derived in detail from US2004/0140178, which is mentioned as the closest state of the art, so that reference is made thereto. As can be seen from FIG. 1, the connection of a plastic carrier 10 with the annular chain links 13 of the two central chains 11 and 12 is formed in that during the casting or molding around of the chain links 13, the plastic or synthetic material matrix penetrates and surrounds the chain links 13 of the two central chains 11 and 12. For the reinforcement of the plastic matrix, reinforcing fibers 14 having a short length are randomly distributed in the plastic carrier.

DESCRIPTION OF SPECIFIC EMBODIMENTS

The construction of a drag chain conveyor having the aforementioned features can be derived in detail from WO 01/81211 A1, which is mentioned as the closest state of the art, so that reference is made thereto. As can be seen from FIG. 1, the connection of a plastic carrier 10 with the annular chain links 13 of the two central chains 11 and 12 is formed in that during the casting or molding around of the chain links 13, the plastic or synthetic material matrix penetrates and surrounds the chain links 13 of the two central chains 11 and 12. For the reinforcement of the plastic matrix, reinforcing fibers 14 having a short length are randomly distributed in the plastic carrier.

Figure 2:
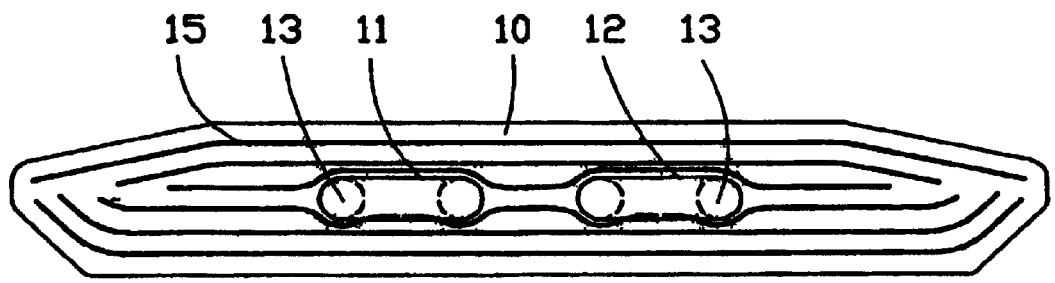

In the embodiment illustrated in FIG. 2, introduced into the plastic matrix of the plastic carrier 10 are reinforcing fibers 15 having such a length that the reinforcing fibers 15 extend over the length of the plastic carriers 10. In so doing, the reinforcing fibers 15 surround the chain links 13 of the two central chains 11 and 12, which chain links are embedded in the plastic matrix.

Figure 3:
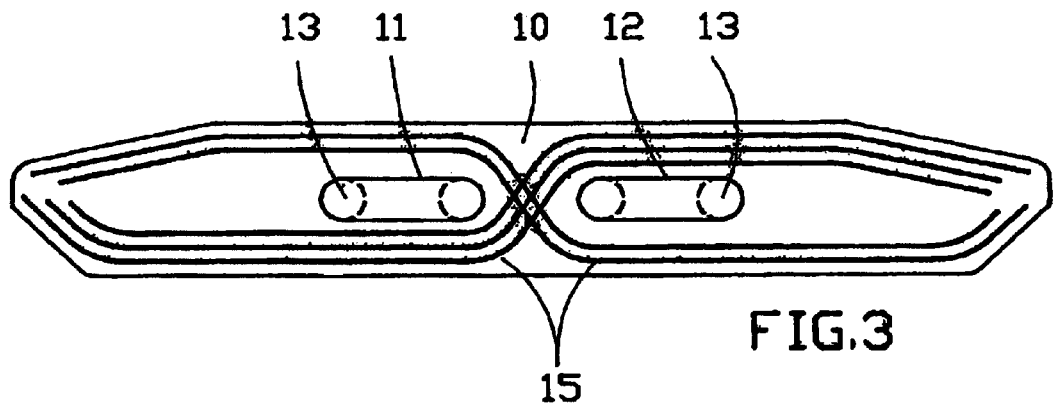

In the embodiment illustrated in FIG. 3, the reinforcing fibers 15 are passed between the chain links 13 of the two central chains 11 and 12 in such a way that the reinforcing fibers 15 cross in the region between the two central chains 11 and 12.

Figure 4:
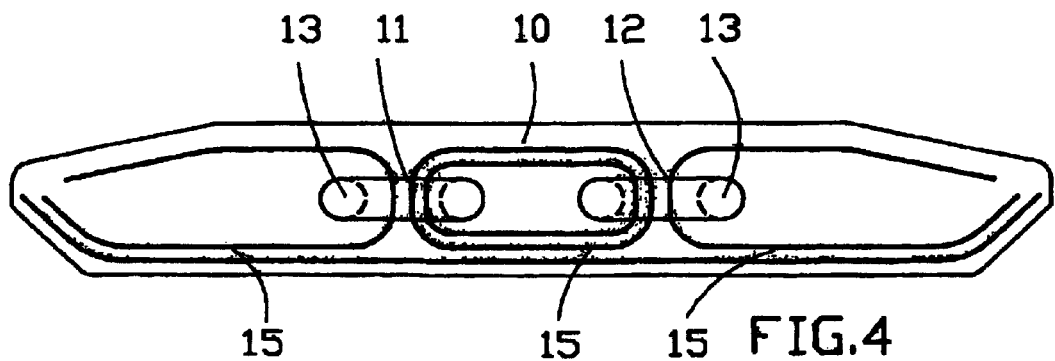

FIG. 4 shows a further alternative arrangement of the course of the reinforcing fibers 15, according to which the reinforcing fibers also extend through the openings of the annular chain links 13 and thus at least partially also interconnect the chain links 13 of the two central chains 11 and 12.

Figure 5A:
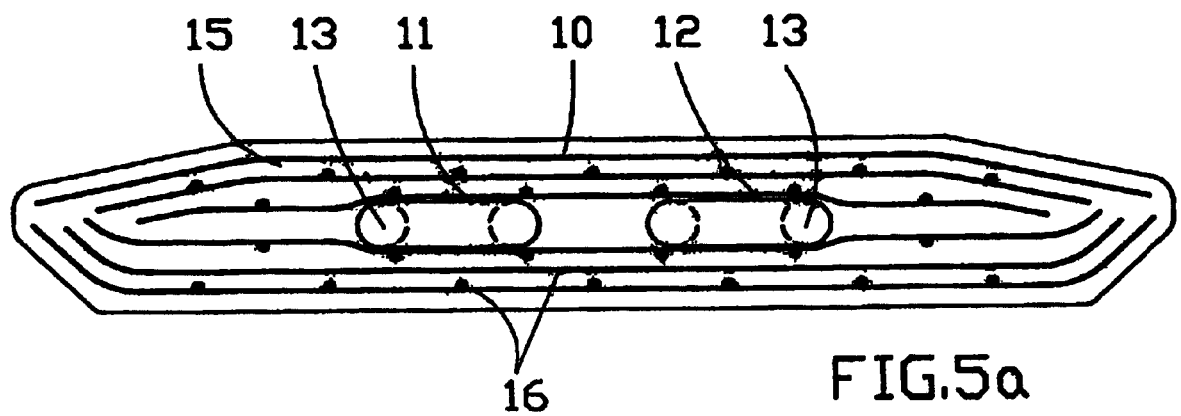
Figure 5B:
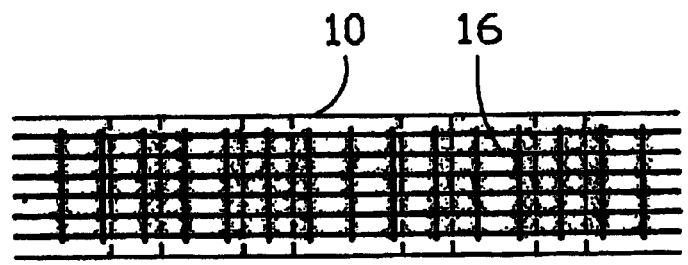

Finally, in the embodiment illustrated in FIG. 5, a mesh 16 of reinforcing fibers is provided that can also be embodied as fabric, braiding or knitting.

The features of the subject matter disclosed in the preceding description, the patent claims, the abstract and the drawing can be important individually as well as in any desired combination with one another for realizing the various embodiments of the invention.

The specification incorporates by reference the disclosure of German priority document 102 54 970.2 filed Nov. 26, 2002 and PCT/EP 2003/012993 filed Nov. 20, 2003.

The present invention is, of course, in no way restricted to the specific disclosure of the specification and drawings, but also encompasses any modifications within the scope of the appended claims.

The invention claimed is:

1. A drag chain conveyor for use in underground mining, comprising:
   interconnected, profiled conveyor chutes;
   at least one conveyor chain of metallic material, guided in said conveyor chutes;
   plastic carriers attached to said at least one conveyor chain wherein attachment is effected via a molding around of annular chain links of said conveyor chain with plastic, and wherein said plastic, which is molded for a simultaneous production of said plastic carriers monolithically with connecting regions that hold said chain links, penetrates and surrounds said chain links; and
   at least one drive means for said at least one conveyor chain.

2. A drag chain conveyor according to claim 1, wherein said at least one conveyor chain is composed of individual, interconnected chain strands having said plastic carriers cast thereon.

3. A drag chain conveyor according to claim 1, wherein said plastic carriers are disposed between two outwardly disposed individual chains.

4. A drag chain conveyor according to claim 1, wherein said plastic carriers are disposed on a centrally extending chain.

5. A drag chain conveyor according to claim 1, wherein plastic carriers are disposed on two spaced-apart central chains that extend centrally through said plastic carriers.

6. A drag chain conveyor according to claim 1, wherein for production of said plastic carriers, including their connecting regions with said chain links, a flowable plastic having self-extinguishing, difficult to ignite, and anti-static properties is used.

7. A drag chain conveyor according to claim 1, wherein for reinforcement, metallic reinforcing particles are cast into said plastic carriers.

8. A drag chain conveyor according to claim 1, wherein for reinforcement of said plastic carriers, reinforcing fibers are introduced into the plastic.

9. A drag chain conveyor according to claim 8, wherein short reinforcing fibers having a random distribution are embedded in the plastic of said plastic carriers.

10. A drag chain conveyor according to claim 8, wherein reinforcing fibers that extend over a length of said plastic carriers are introduced into the plastic.

11. A drag chain conveyor according to claim 10, wherein said reinforcing fibers extend about said chain links.

12. A drag chain conveyor according to claim 10, wherein said reinforcing fibers are passed through said chain links.

13. A drag chain conveyor according to claim 8, wherein a mesh of reinforcing fibers is disposed on or in the plastic.

14. A drag chain conveyor according to claim 8, wherein a fabric of reinforcing fibers is introduced into the plastic.

15. A drag chain conveyor according to claim 8, wherein a braiding of reinforcing fibers is introduced into the plastic.

16. A drag chain conveyor according to claim 8, wherein a knitting of reinforcing fibers is introduced into the plastic.

* * * * *

UNITED STATES PATENT AND TRADEMARK OFFICE
CERTIFICATE OF CORRECTION

| | | |
|---|---|---|
| PATENT NO. | : 7,150,351 B2 | Page 1 of 1 |
| APPLICATION NO. | : 10/536793 | |
| DATED | : December 19, 2006 | |
| INVENTOR(S) | : Wiejack-Symann | |

It is certified that error appears in the above-identified patent and that said Letters Patent is hereby corrected as shown below:

Title page,
Item [54] should read as follows:

[54] Title: DRAG CHAIN CONVEYOR HAVING PLASTIC CARRIERS

Signed and Sealed this

Eighteenth Day of September, 2007

JON W. DUDAS
*Director of the United States Patent and Trademark Office*